(12) United States Patent
Berghoff

(10) Patent No.: US 6,461,558 B1
(45) Date of Patent: Oct. 8, 2002

(54) INJECTION MOLDING APPARATUS AND METHOD

(75) Inventor: Hans Lothar Berghoff, Cheng Soon Garden (SG)

(73) Assignee: Fastech System(s) Pte Ltd. (SG)

( * ) Notice: Subject to any disclaimer, the term of this patent is extended or adjusted under 35 U.S.C. 154(b) by 0 days.

(21) Appl. No.: 09/171,662

(22) PCT Filed: Apr. 24, 1997

(86) PCT No.: PCT/SG97/00017
§ 371 (c)(1),
(2), (4) Date: Mar. 23, 1999

(87) PCT Pub. No.: WO97/39870
PCT Pub. Date: Oct. 30, 1997

(30) Foreign Application Priority Data

Apr. 25, 1996 (SG) .............................................. 9609523

(51) Int. Cl.[7] ........................... B29C 45/06; B29C 70/72
(52) U.S. Cl. ............... 264/272.17; 425/129.1; 425/544; 425/126.1
(58) Field of Search .................. 425/116, 117, 425/129.1, 544, 576, DIG. 16.228, 126.1; 264/272.17, 328.11

(56) References Cited

U.S. PATENT DOCUMENTS

| | | | |
|---|---|---|---|
| 4,307,057 | 12/1981 | Hettinga | 425/576 |
| 4,424,015 | 1/1984 | Black et al. | 425/576 |
| 4,720,253 | 1/1988 | Koentges | 425/159 |
| 4,726,757 | 2/1988 | Berry | 425/576 |
| 5,698,242 | * 12/1997 | Chen et al. | 425/544 |

FOREIGN PATENT DOCUMENTS

| | | | |
|---|---|---|---|
| DE | 717122 | 2/1942 | |
| JP | 60-110414 | * 6/1985 | 425/117 |
| JP | 62070013 A | * 3/1987 | 425/126.1 |
| JP | 63-15715 | * 1/1988 | 425/116 |
| JP | 06328497 A | * 11/1994 | |
| WO | WO 86/01145 | 2/1986 | |
| WO | WO 95/18461 | 7/1995 | |

* cited by examiner

Primary Examiner—Robert Davis
(74) Attorney, Agent, or Firm—Burns, Doane, Swecker & Mathis, L.L.P.

(57) ABSTRACT

An injection molding apparatus and a method of encapsulating integrated circuits which include a plurality of molding presses, such as transfer molding presses for encapsulating integrated circuits, which are mounted on an indexable rotary table. Stationary loading and unloading stations are arranged at spaced angular locations around the table for loading an insert into the mold cavities. A controller is provided to rotate with the molding presses for individually controlling function thereof such as opening and closing of the presses and temperature and pressure in the molds.

16 Claims, 3 Drawing Sheets

INJECTION MOLDING APPARATUS AND METHOD

FIELD OF THE INVENTION

This invention relates to an apparatus and method for injection molding, for example for encapsulating integrated circuits.

BACKGROUND OF THE INVENTION

Injection molding apparatus, such as a transfer molding installation for encapsulating integrated circuits, typically involves a plurality of molding presses associated with a plurality of movable robots for loading and unloading the molding presses. For example, a row of molding presses may be arranged with a loading robot and unloading robot movable along the row to insert integrated circuit leadframes into the molds and remove the encapsulated integrated circuits after molding. However, several difficulties are associated with this type of arrangement, one of those being potential interference between the loading and unloading robots, for example, in accessing one of the plurality of molding presses.

SUMMARY OF THE INVENTION

Accordingly, the present invention provides an injection molding apparatus comprising a plurality of molding presses each adapted to receive at least one mold, each mold defining a cavity shaped for the formation of a molded product, the plurality of molding presses being mounted for rotational movement about a common axis with respect to a plurality of stations arranged around the plurality of molding presses, the molding apparatus being adapted to sequentially align ones of said plurality of molding presses with one of said stations for loading of molding material and unloading of a molded product The present invention also provides an integrated circuit encapsulation apparatus comprising a plurality of transfer molding presses mounted on a rotatable index table, each molding press being adapted to receive at least one mold defining a cavity adapted to receive an integrated circuit die and attached leadframe for encapsulation thereof, and a plurality of stations arranged around the rotatable index table wherein indexed rotation of the table is effective to align ones of the molding presses with one of the stations, said stations including an insert loading station for loading an integrated circuit die and attached leadframe into a mold of a mold press aligned therewith, a molding compound loading station for loading an encapsulation material into a pot of an aligned molding press, and an unloading station for removing an encapsulated integrated circuit from a mold of an aligned molding press.

In a preferred form of the invention, the molding presses and stations are arranged on a rotating index table, such that when a first molding press is aligned with the unloading station, a second molding press is aligned with the mold cleaning station, and a third molding press aligned with the loading and compound molding compound loading stations. Align all stations with respect to each other.

Preferably, the apparatus includes a first controller circuit mounted for movement with the molding presses, for independently controlling the opening and closing thereof. A second controller circuit may be provided to control functions of the stations, with the first and second controller circuits communicating by way of a rotating electrical connection. A similar rotating electrical connection may be provided to power the molding presses in the event that they are electrically operated. Alternatively, if the molding presses are hydraulic or pneumatic, then a rotatable hydraulic or pneumatic connection may be provided between a pressurised fluid source and hydraulic/pneumatic circuits of the molding presses and their counterparts.

In accordance with the present invention there is also provided a method for encapsulating integrated circuits, wherein at least one injection molding press and associated encapsulation mold is mounted for rotational movement into successive alignment with a plurality of respective stations arranged around the at least one molding press, comprising the steps of:

rotationally aligning the press with a first said station and thereat loading an integrated circuit die into the associated mold;

rotationally aligning the press with a second said station and thereat loading the press with an encapsulation material;

performing a transfer molding operation wherein said integrated circuit die is encapsulated with said material in said mold; and rotationally aligning the press with a third said station and thereat unloading the encapsulated integrated circuit from the mold cleaning station.

Preferably a plurality of injection molding presses are used to repeatedly cycle through the method steps, such that when one of the steps is being performed on one press, another of the steps is being performed on another press.

BRIEF DESCRIPTION OF THE DRAWING

The invention is described in greater detail herein below by way of example only, with reference to the accompany drawings, wherein.

DETAILED DESCRIPTION OF THE PREFERRED EMBODIMENTS

Figure 1:
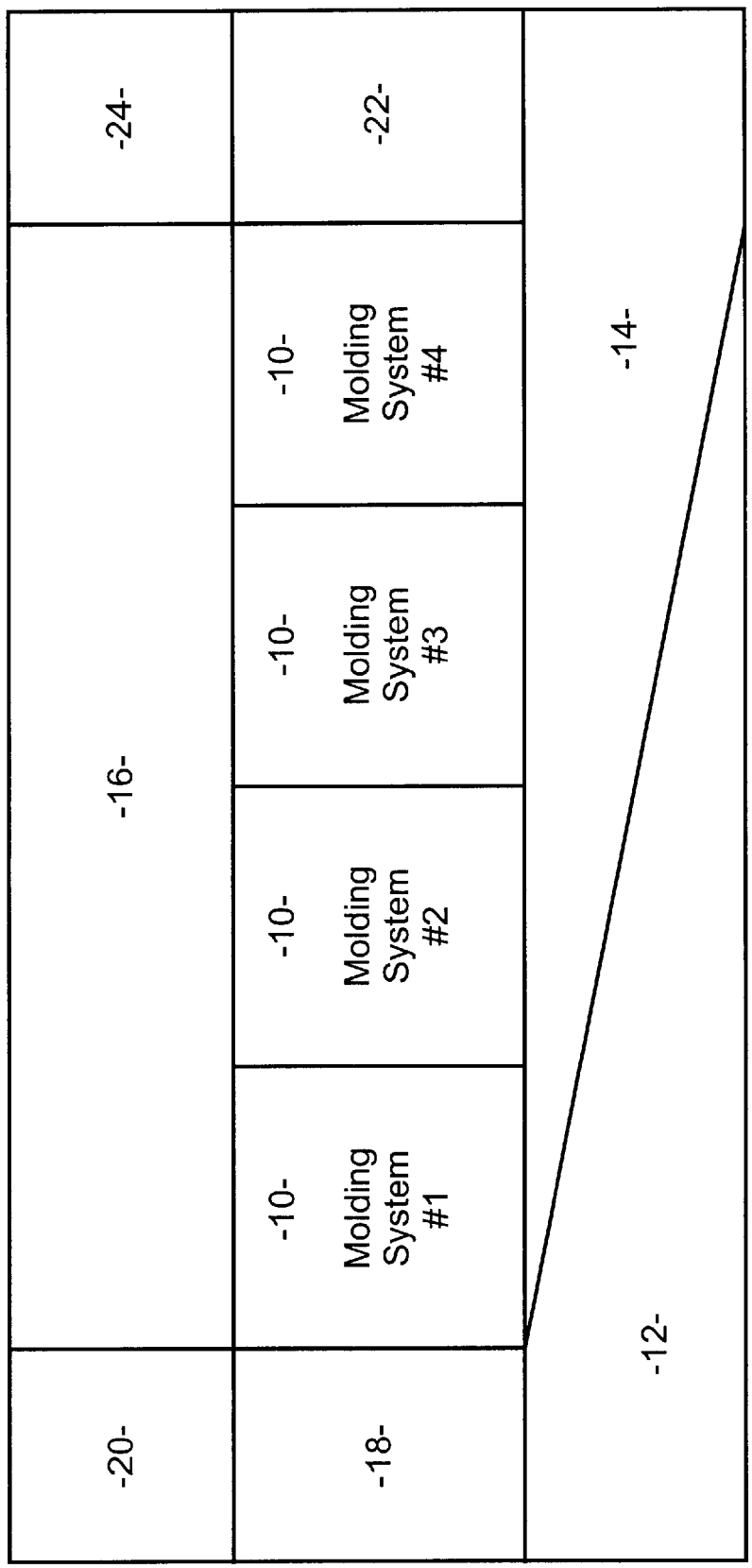
FIG. 1 is a schematic block diagram illustrating a prior art injection molding arrangement.

Referring firstly to FIG. 1, there is shown a schematic layout of an injection molding arrangement of the prior art, comprising four molding presses 10. The molding presses 10 are arranged in a row, all facing the same direction. An area indicated by reference numeral 12 represents a region of movement along the front of the molding presses 10 of a loading robot, which requires access to the front of each of the molding presses. Similarly, reference numeral 14 indicates a region for movement of an unloading robot which also requires access to the front of each molding press 10. A cleaning robot is arranged to move in an area 16 along the rear of the molding presses. Further, mechanisms are arranged at 18 and 20 for passing an integrated circuit and attached leadframe from a magazine storage (not shown) to the loading robot 12, and for passing an encapsulating material pellet to the loading robot 12, respectively. Also, unloading mechanisms are arranged at 22 and 24 for receiving the encapsulated integrated circuits from the unloading robot, degating the leadframe, and passing the encapsulated integrated circuit to a storage area.

Figure 2A:
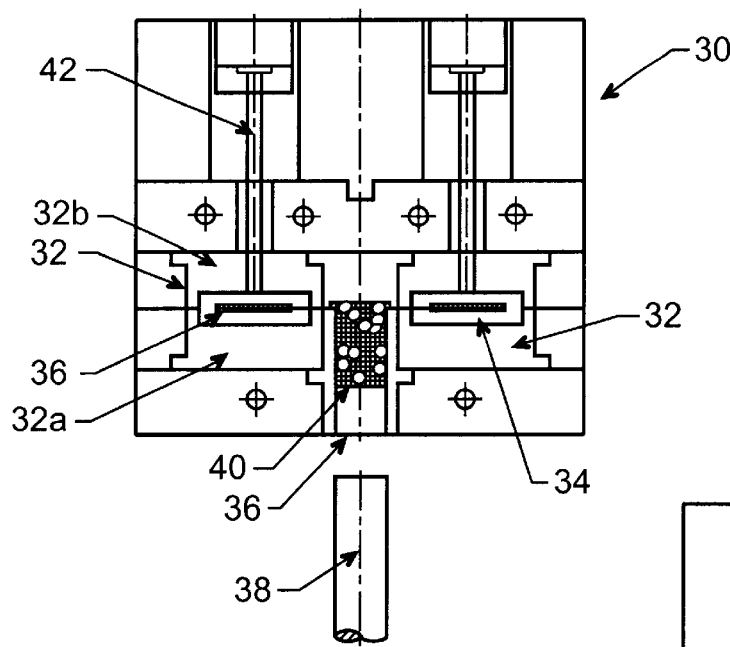
FIGS. 2A, 2B and 2C show an exemplary transfer molding press illustrating the operation thereof for encapsulation of an integrated circuit and leadframe.
Figure 2B:
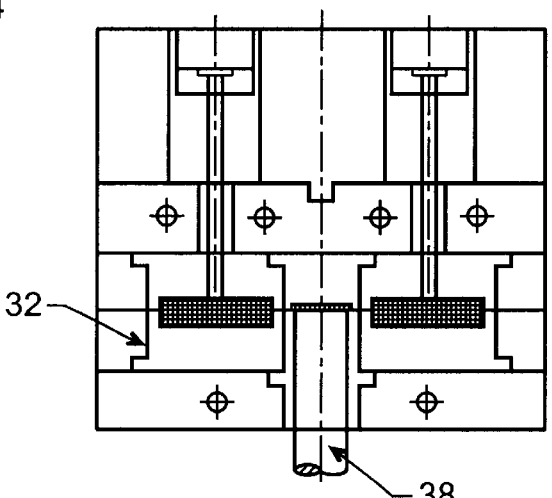
Figure 2C:
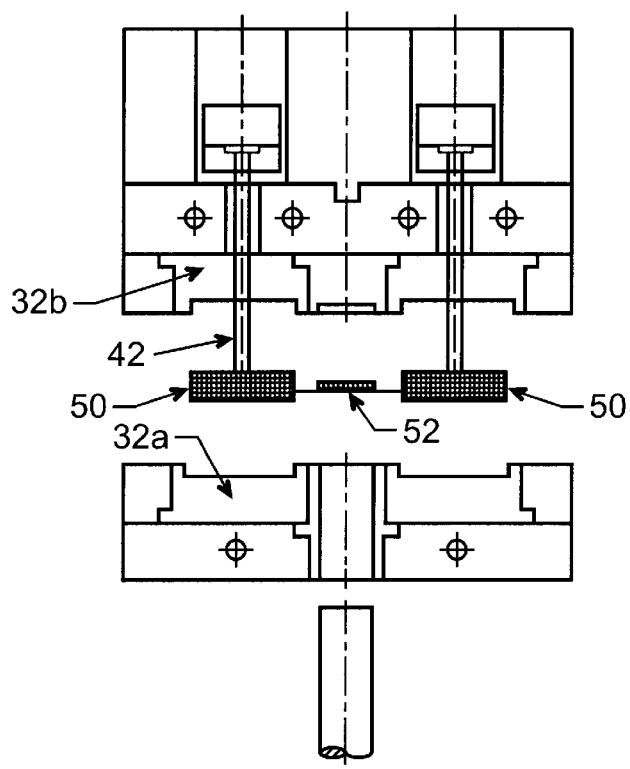

FIGS. 2A, 2B and 2C are cross-sectional views of an exemplary transfer molding press 30 adapted to receive two molds 32. Each mold 32 is arranged within the molding press 30, and comprises upper and lower mold parts 32a, 32b which fit together to define a mold cavity 34.

The molding press 30 is shown in FIG. 2A in a closed position, having been loaded with integrated circuit leadframes 36 within the respective mold cavities 34, and a pellet of encapsulating material 40 in a gangpot 37. Encapsulation of the integrated circuits 36 is achieved by heating the encapsulating material pellet 40 and pressing it within the gangpot using a transfer plunger 38, which causes the pellet 40 to liquefy and flow into the mold cavities 34 through small passages between the gangpot and the mold cavities (see FIG. 2B). After allowing the encapsulating material to solidify again, the molding press 30 is opened (FIG. 2C), wherein the mold parts 32a,32b are separated. The encapsulated integrated circuits 50 are lifted from the mold cavity by way of ejector pins 42, so as to expose them for removal from the molding press. After removal of the encapsulated integrated circuits 50, the open molding press is ready to receive new leadframe inserts 36 and encapsulating material pellet 40 to repeat the encapsulating process.

The operation of the prior molding system shown in FIG. 1 for encapsulating integrated circuit leadframes is described below.

First, one or more pre-heated integrated circuit leadframes are loaded into a molding press 10, which has a temperature of about 160° C. to 200° C., by the loading robot arm which services all of the molding presses 10. The same loading robot is used to insert a pre-formed epoxy resin pellet into the gangpot of the molding press, after which the press is closed (such as shown in FIG. 2A). The epoxy resin is then transferred from the gangpot to fill the mold cavities by pressing the resin pellet against the hot mold surface using the transfer plunger (FIG. 2B). The resin is cured in the mold for about 20 to 90 seconds, after which the molding press is opened and the encapsulated integrated circuit is ejected from the mold cavities (FIG. 2C). In order to remove the encapsulated integrated circuits from the molding press, the unloading robot must wait until the loading robot is out of the way, and vice versa, which can waste significant time depending on the relevant positions of the loading and unloading robots and the molds to which they require access at a given time. Also, with the cleaning robot 16 arranged to the rear of the molding presses, there are robot arms on both sides of the row of molding presses which can make inspection and maintenance quite difficult.

Figure 3:
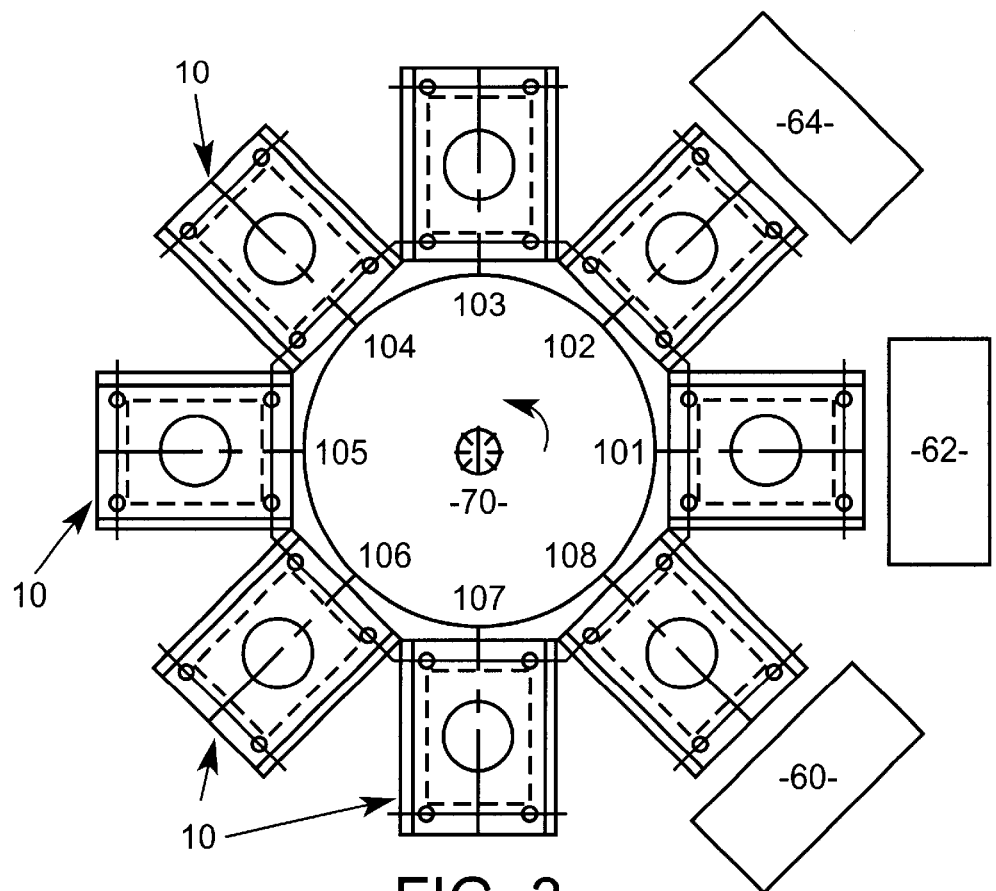
FIG. 3 is a plan view of an injection molding arrangement according to one form of the invention.
Figure 4:
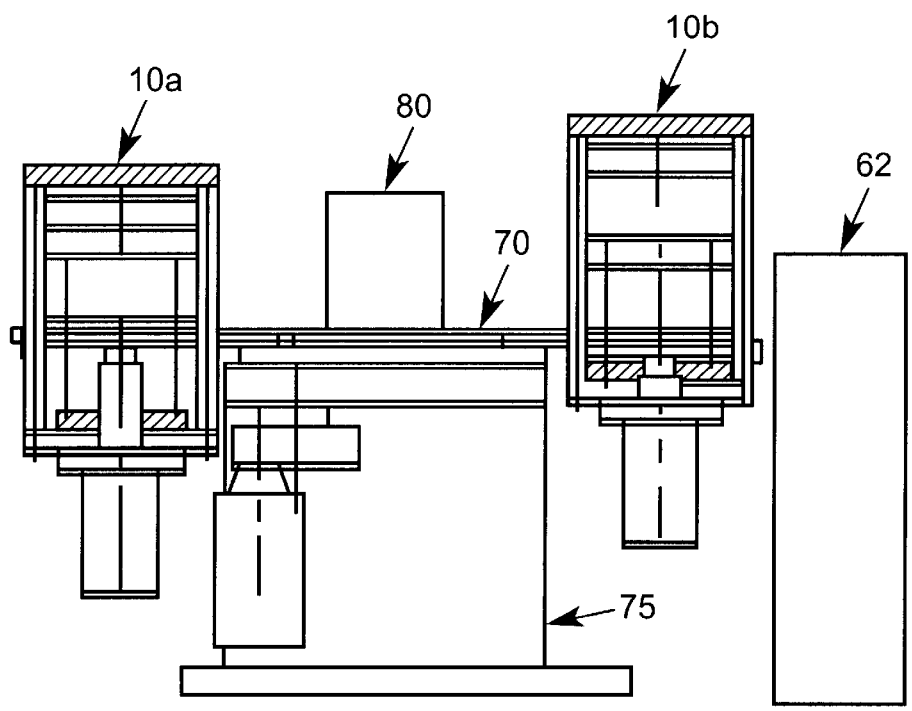
FIG. 4 is a cross-sectional view of the injection molding arrangement of FIG. 3.

The injection molding system of embodiments of the present invention provides rotational movement of the molding presses relative to loading and unloading stations, rather than movement of the loading and unloading mechanisms (robot arms). FIG. 3 is a plan view of an injection molding apparatus according to one form of the invention, and FIG. 4 is a cross-sectional view through the molding apparatus of FIG. 3.

A plurality of molding presses 10 (FIG. 3) are arranged equally spaced and mounted around the circumferential perimeter of a circular rotatable index table 70. The molding presses 10 are mounted to face outwardly with respect to the index table axis, such that the mold cavities within the molds of the molding presses are accessible when the molding presses are open. The index table 70 is rotatable in this case in an anti-clockwise direction, and is indexable so that each of the molding presses 10 can be aligned to each of a plurality of equally spaced angular positions 101 to 108. Stations 60,62 and 64 shown in FIG. 3 are positioned around the molding presses mounted on the index table, with each station positioned so as to align with a molding press 10 when in one of the angular positions 101 to 108. In this case, an unloading station 60, such as a pick and place robot arm is positioned so as to align with a molding press when in the angular position represented by reference numeral 108. An insert loading station 62 is positioned so as to align with a molding press at angular position 101, and an encapsulation material pellet loading station 64 is arranged so as to align with a molding press at angular position 102. For anti-clockwise rotation of index table 70, the insert loading station 62 is arranged in the anti-clockwise direction around the table axis in comparison to unloading station 60, and pellet loading station 64 arranged to the anti clockwise side of insert loading station 62.

Operation of the molding apparatus can be best understood by considering a single molding press 10 on the indexed rotatory table 10, beginning at angular position 101 which is aligned with the insert loading station 62. At this position, the molding press 10 is open, such as illustrated at 10b in FIG. 4, to allow a pre-heated integrated circuit die and attached leadframe to be placed within the one or more molds of the molding press using a pick and place robot arm of the loading station 62. Following loading of the leadframe, the index table 70 is rotated so as to align the molding press with the pellet loading station 64, where a pellet of encapsulation material is loaded into the gangpot of the molding press. After loading of the pellet, the index table is again rotated so that the molding press passes to angular position 103, where the press is closed and the transfer molding operation takes place. As the molding press successively passes through angular positions 104, 105 and 106, the encapsulation material within the mold cavities is allowed to set, and at angular position 107 the molding press is opened for access to the encapsulated integrated circuits. Finally, the molding press rotates to angular position 108 where it is aligned with unloading station 60 which operates to remove the encapsulated integrated circuits from the molding press using, for example, a pick and place unit. After unloading, the encapsulated integrated circuit is passed to a degating station and storage magazine and mold cleaning (not shown). Following the unloading operation at angular position 108, the molding press then returns to position 101 to repeat the encapsulation process.

Each of the molding presses 10 disposed around the index table 70 can simultaneously perform the operations described above, the stage within the encapsulation process for a given molding press being determined by its angular position with respect to the stations 60,62,64.

Since no interference can occur between the loading and unloading operations, the injection molding apparatus and method of the preferred embodiment of the present invention can result in an increase in production time savings as compared with the prior art system described hereinabove.

It will be recognised by those skilled in the art that any suitable number of molding presses can be arranged around the index table, with four, six or eight molding presses being preferred. Further, more than a single set of the loading and unloading stations 60,62 and 64 can be arranged around the index table. For example, another unloading station 60 could be placed at position 104, with loading stations 62 and 64 placed at positions 105 and 106 respectively. The desirability of that type of arrangement may depend upon the number of molding presses on the index table and the curing time required for the molding material. Additionally, if regular cleaning of the molds is required, a cleaning station can be interposed between the unloading station 60 and loading station 62 for closing of the molds following each molding operation as is known to those in the injection molding art.

In order to control the opening and closing of the molding presses, an electrical controller 80 may be placed for rotation with the presses 10 and index table 70. A suitably programmed microprocessor, PLC or the like can be employed, is known in the art. In the preferred embodiment, the controller 80 mounted on the table is also programmed to individually control the mold temperature and mold pressure of each molding press. A second controller may be provided in order to control the functions of the stations 60,62,64, which may also comprise, for example, a computer or microprocessor circuit The second controller is preferably contained in a control panel (not shown) which is stationary with respect to the stations 60,62,64. The control panel would include facilities for a user to input desired mold temperatures and pressures and the like. To facilitate coordination and communication between the two controller circuits, an electrical connection is required for communication between the controllers which allows the controller mounted on the index table 70 to rotate. Accordingly, a rotatable electrical connection can be employed, for example having annular electrical contacts coaxial with the index table axis, with brush-type contacts arranged to bear against the annular contacts for electrical connection therewith. For example, a similar contact technique as employed for connection to electrical motor moving armature windings could be used. Also, if the molding presses 10 operate using hydraulic or pneumatic power, then a connection is required between the hydraulic or pneumatic circuits of the presses and a source of pressurised hydraulic or pneumatic fluid. For this purpose, a hydraulic or pneumatic pressure pipe can be provided in the base 75 of the molding apparatus and coaxial with the rotatable table, having a rotatable connection to a pipe connecting with the hydraulic/pneumatic circuits of the presses mounted on the index table.

As an alternative to the rotatable electrical connector for passing signals between the fixed and rotatable controller circuits, a wireless infrared or radio signal transmission and reception system for passing signals between the controllers could also be employed.

The foregoing detailed description of the invention has been put forward by way of example only, and is not intended to be considered limiting to the invention which is defined in the appended claims.

What is claimed is:

1. An injecting molding apparatus comprising a plurality of molding presses each having a respective actuator and transfer plunger and each adapted to receive at least one mold, each mold defining a cavity shaped for the formation of a molded product, the plurality of molding presses being mounted for rotational movement about a common axis with respect to a plurality of stations arranged around the plurality of molding presses, the molding apparatus being adapted to sequentially align one of said plurality of molding presses with one of said stations for loading of molding material and unloading of a molded product.

2. Molding apparatus according to claim 1, wherein said plurality of molding presses are mounted on a rotatable platter, the rotational movement of which is indexable so as to align said molding presses and said stations.

3. Molding apparatus according to claim 1, wherein each said molding press comprises a transfer molding press.

4. Molding apparatus according to claim 3, wherein each mold cavity is adapted to receive an insert comprising an integrated circuits and leadframe for eacapsulation.

5. Molding apparatus according to claim 2, further comprising a controlling means including a controller circuit mounted for movement with said molding presses for controlling operation of said molding presses.

6. A molding apparatus as claimed in claim 5, wherein said controller circuit individually controls opening and closing of said molding presses, in use.

7. A molding apparatus as claimed in claim 6, wherein said controlling means operates to independently control mold temperature and pressure of each of the plurality of molding presses.

8. A molding apparatus as claimed in claim 7, including a pivotable electrical connection between said controller circuit and a central controller of said controlling means which is not mounted for movement with said rotatable platter.

9. A molding apparatus as claimed in claim 8, including a pivotable hydraulic connection between a pressurised hydraulic fluid source and hydraulic circuits of said molding presses.

10. A molding apparatus as claimed in claim 8, wherein functions of said plurality of stations are controlled by said central controller.

11. A molding apparatus as claimed in claim 1, wherein said plurality of stations include an insert loading station for loading an integrated circuit die and attached leadframe into a mold of a mold press aligned therewith.

12. An integrated circuit encapsulation apparatus comprising a plurality of transfer molding presses mounted on a rotatable index table, each molding press having a respective actuator and transfer plunger and being adapted to receive at least one mold defining a cavity adapted to receive an integrated circuit die and attached leadframe for encapsulation thereof, and a plurality of stations arranged around the rotatable index table wherein indexed rotation of the table is effective to align ones of the molding presses with ones of the stations, said stations including an insert loading station for loading an integrated circuit die and attached leadframe into a mold of a mold press aligned therewith, a molding compound loading station for loading an encapsulation material into a pot of an aligned molding press, and an unloading station for removing an encapsulated integrated circuit from a mold of an aligned molding press.

13. An integrated circuit encapsulation apparatus according to claim 12, further comprising a first controller circuit, mounted for movement with said table, for controlling functions of said plurality of presses, and a second controller circuit for controlling said stations, and a pivotable electrical connection for communication of signals between said first and second controller circuits regardless of the rotational orientation of said table.

14. An integrated circuit encapsulation apparatus according to claim 13, wherein said first controller circuit, in use, individually controls mold temperature and pressure of each of the plurality of molding presses.

15. A method for encapsulating integrated circuits, in which at least one injection molding press and associated encapsulation mold is mounted for rotational movement into successive alignment with a plurality of respective stations arranged around the at least one molding press each molding press having a respective actuator and transfer plunger, the method comprising:

rotationally aligning the press with a first station and loading an integrated circuit die into the associated mold;

rotationally aligning the press with a second station and loading the press with an encapsulation material;

performing a transfer molding operation wherein said integrated circuit die is encapsulated with said material in said mold; and rotationally aligning the press with a third station and unloading the encapsulated integrated circuit from the mold.

16. A method as claimed in claim 15, wherein a plurality of injection molding presses are used to repeatedly cycle through the steps, such that when one of the steps is being performed on one press, another of the steps is being performed on another press.

* * * * *

UNITED STATES PATENT AND TRADEMARK OFFICE
CERTIFICATE OF CORRECTION

PATENT NO.    : 6,461,558 B1                                     Page 1 of 1
DATED         : October 8, 2002
INVENTOR(S)   : Hans Lothar Berghoff It is certified that error appears in the above-identified patent and that said Letters Patent is hereby corrected as shown below:

<u>Drawings,</u>
Sheet 2, Figure 2A, the reference numeral "36" appearing under the reference numeral "40" and pointing to the gangpot, as described in Column 3, line 11, should appear as reference numeral -- 37. --

Signed and Sealed this

Twenty-fourth Day of June, 2003

JAMES E. ROGAN
*Director of the United States Patent and Trademark Office*